United States Patent [19]

Yamashita

[11] Patent Number: 4,471,251

[45] Date of Patent: Sep. 11, 1984

[54] MOTOR MOUNTING IN AUTOMOBILE BODY STRUCTURE

[75] Inventor: Noboru Yamashita, Tokyo, Japan

[73] Assignee: Asmo Co., Ltd., Shizuoka, Japan

[21] Appl. No.: 418,399

[22] Filed: Sep. 15, 1982

[30] Foreign Application Priority Data

Mar. 26, 1982 [JP] Japan .................................. 57-49517

[51] Int. Cl.³ .......................... E05F 11/44; H02K 5/04
[52] U.S. Cl. ........................................ 310/89; 49/349;
296/146; 310/91
[58] Field of Search ....................... 310/42, 47, 50, 89,
310/91, 90; 296/146; 49/349

[56] References Cited

U.S. PATENT DOCUMENTS

| | | | |
|---|---|---|---|
| 3,388,459 | 6/1968 | Doghterman | 310/42 |
| 3,479,540 | 11/1969 | Fox | 310/89 |
| 3,742,646 | 7/1973 | Piech | 49/349 |
| 4,353,185 | 10/1982 | Saigne | 49/349 |

FOREIGN PATENT DOCUMENTS 2729398  5/1979  Fed. Rep. of Germany ........ 310/89

Primary Examiner—J. D. Miller
Assistant Examiner—D. L. Rebsch
Attorney, Agent, or Firm—Jackson, Jones & Price

[57] ABSTRACT

A motor mounting for mounting a D.C. motor in an automobile body structure comprises a casing for the motor. The casing is constituted by a pair of casing halves and one of the casing halves is an integral part of the automobile body structure.

8 Claims, 12 Drawing Figures

MOTOR MOUNTING IN AUTOMOBILE BODY STRUCTURE

BACKGROUND OF THE INVENTION

This invention relates to a motor mounting in an automobile body structure.

Automobiles now in use utilize a variety of D.C. motors for driving, for example, windshield wipers, powered window regulators, retractable headlight actuators, radio antenna lifters, powered sunroof regulators, and other powered equipment.

According to the prior art, any D.C. motor for a particular use in an automobile is fitted or installed at a required location in the automobile body structure after it has completely been assembled. The completely assembled condition of the motor means that the motor has been encased with the required component parts thereof and has been rendered ready for use.

By way of example, as shown in FIG. 1 of the accompanying drawings which illustrate a powered window regulator, a motor 11 has an output shaft on which a drive pinion 13 is rigidly mounted. The rotation of the drive pinion 13 caused by the rotation of the motor 11 is, after having been reduced by a reduction gear train 14 consisting of large and reduced diameter gears 15 and 16 meshed with each other, transmitted to a sector gear 17, the movement of which sector gear 17 is then transmitted through a connecting member 18 to a link mechanism 23 comprising a first link 20 pivotally connected at one end to a door panel 19 on one side adjacent to the interior of the automobile (not shown) and second and third links 21 and 22 pivotally connected at one respective end to the first link 20. The movement of the link mechanism 23 so caused renders the door window 24 to move up and down for closing and opening depending on the direction of rotation of the motor 11.

In the powered window regulator of the construction described with reference to and shown in FIG. 1, the D.C. motor in the completely assembled condition has been used for the motor 11 and is fitted to the inner door panel 19 by means of a fixture 26 while positioned between the inner door panel 19 and an outer door panel 25.

Where the completely assembled motor is to be fitted to the door panel 19 by means of the fixture 26 or any other fitting element as the motor 11 for the powered window regulator, not only are two separate manufacturing steps required for fabricating the motor and for fitting the assembled motor to the door panel, but also the use of the fixture 26 is required. In addition, the motor 11 for the powered window regulator must be adjusted in position unless the reduction gear train 14 is correctly installed. Furthermore, in order to attain a sufficient rigidity for the support of the motor 11 for the powered window regulator, the use of ribs or the like at the location where the motor is installed is required.

SUMMARY OF THE INVENTION

Accordingly, this invention has been developed with a view to substantially eliminating the disadvantages and inconveniences encountered in mounting the motor in the automobile body structure and has for its essential object to provide an improved motor mounting wherein a portion of the automobile body structure is concurrently used as a part of the motor casing thereby minimizing the number of parts which would be required if that portion of the automobile body structure is not used as that part of the motor casing.

Another important object of this invention is to provide an improved motor mounting of the type referred to above, wherein the assembly and fitting of the D.C. motor can be carried out at the same site, thereby enabling an automobile to be readily manufactured.

A further object of this invention is to provide an improved motor mounting of the type referred to above, wherein the D.C. motor can be precisely and correctly positioned relative to that portion of the automobile body structure without requiring any complicated procedures.

According to this invention, a portion of the automobile body structure where the motor is to be installed is molded in the form of a shaped cavity to provide one of the casing halves of the motor casing which are so divided along a plane parallel to a motor shaft. The wall defining the shaped cavity for the accommodation of a portion of the motor has also defined therein a first recess for the support of a holder for contact brushes, a second spaced recesses for the support of respective field magnets, a third spaced recesses for the support of bearings on the motor shaft, and a fourth recess for the accommodation of a motion transmitting mechanism for transmitting the rotational force of the motor shaft to an external driven element. The first to third recesses are positioned in the shaped cavity in alignment with a commutator of the motor, an armature of the motor, and the bearing on the motor shaft, respectively.

BRIEF DESCRIPTION OF THE DRAWINGS

These and other objects and features of this invention will become apparent from the following description taken in conjunction with preferred embodiments thereof with reference to the accompanying drawings, in which.

DETAILED DESCRIPTION OF THE EMBODIMENTS

Figure 1:
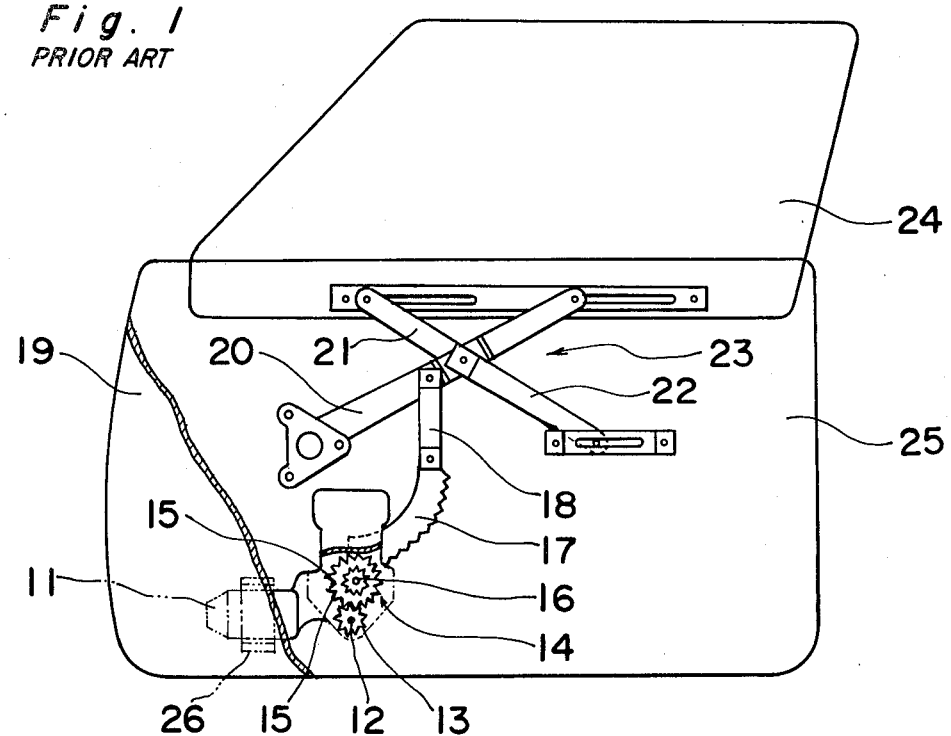
FIG. 1 is a schematic side view, with a portion broken away, of one of the automobile side doors, showing a powered window regulator utilizing a completely assembled drive motor.

Before the description of the preferred embodiments of this invention proceeds, it is to be noted that like parts are designated by like reference numerals throughout the accompanying drawings.

Figure 2:
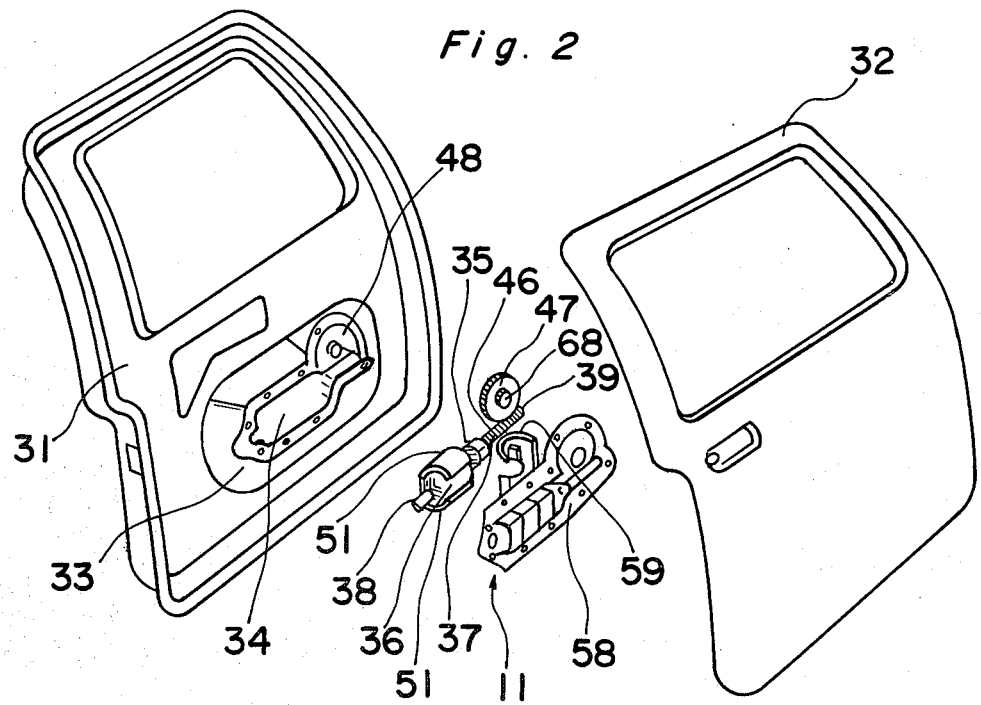
FIG. 2 is an exploded view of one of the automobile side doors, showing a powered window regulator to which this invention is applied as a first preferred embodiment.

Referring first to FIG. 2 which illustrates the application of this invention to a powered window regulator, there is shown an automobile side door of double-walled structure comprising inner and outer door panels 31 and 32 which are shown as separated from each other for the purpose of the description of this invention. A lower portion of the inner door panel 31 below the window is depressed to provide a flat-topped pedestal 33 protruding towards the outer door panel 32, which flat-topped pedestal 33 is in turn depressed inwardly in a direction counter to the outer door panel 32 to define a shaped cavity 34 while leaving a flat rim area 55 (FIG. 3) surrounding the opening of the cavity 34. This cavity 34, as will become clear from the subsequent description, serves as one of the casing halves of a casing for the D.C. motor 11. This can be accomplished by the utilization of any known press work.

As is well known, the D.C. motor 11 comprises a motor shaft 37, a commutator 35 rigidly mounted on the shaft 37, an armature 36 rigidly mounted on the shaft 37, a pair of contact brushes held in sliding contact with the commutator 35 for supplying electrical power to the armature 36 through the commutator 35, and at least a pair of arcuate field magnet pieces 51 opposite in polarity to each other and encircling the armature 36. In general, all of these component parts are housed in a casing of two-piece construction with the motor shaft 37 having bearings mounted thereon at 38 and 39. However, in this invention, it is the wall defining the shaped cavity 34 which constitutes one of the casing halves of the casing for the D.C. motor 11.

Figure 3:
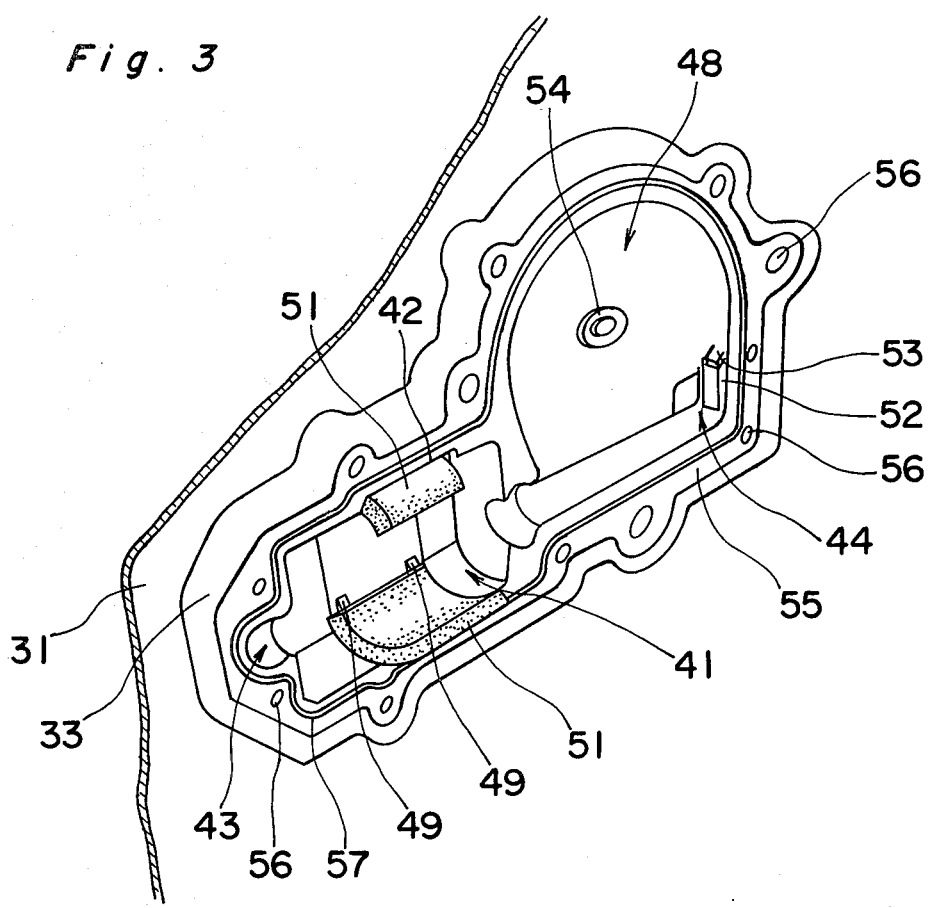
FIG. 3 is a perspective view, on an enlarged scale, showing a shaped cavity defined in a portion of the automobile side door shown in FIG. 2.
Figure 6:
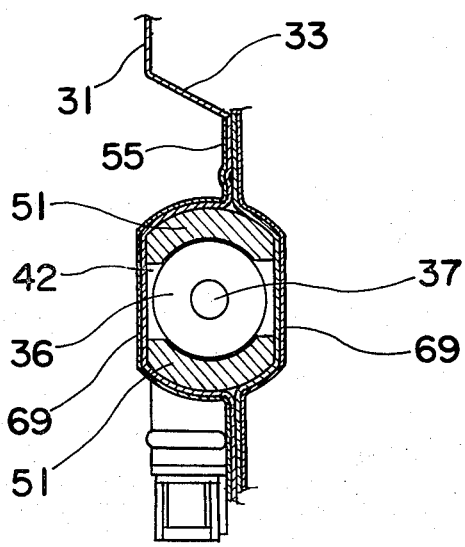
FIG. 6 is a cross-sectional view taken along the line VI—VI in FIG. 4.
Figure 4:
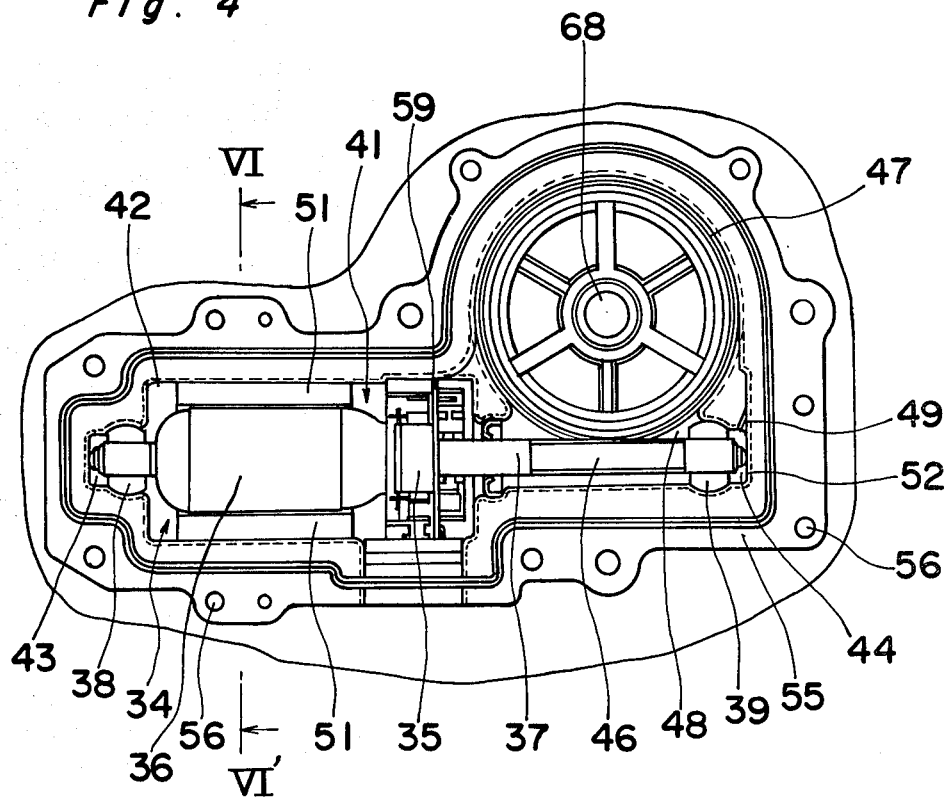
FIG. 4 is a side elevational view, on an enlarged scale, showing the shaped cavity in which the motor is assembled.
Figure 5:
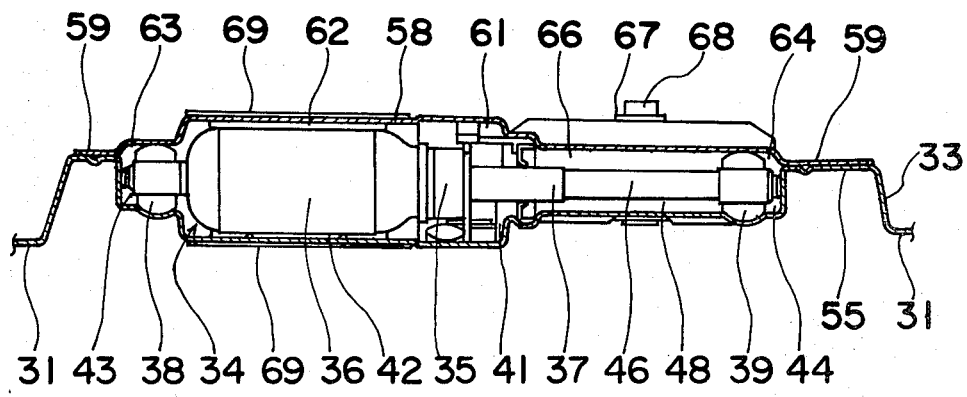
FIG. 5 is a cross-sectional view of FIG. 4, as viewed from above to show a covering member.

As best shown in FIGS. 3 to 5, the wall defining the shaped cavity 34 is formed with a first recess 41 for accommodating a brush holder 59 for the contact brushes, second spaced recesses 42 for accommodating the respective field magnet pieces 51, third spaced recesses 43 and 44 for accommodating the respective bearings 38 and 39 on the motor shaft 37, and a fourth recess 48 for accommodating a motion transmitting mechanism which comprises a worm 46, mounted rigidly on, or otherwise formed with, the motor shaft 37 on that side of the commutator 35 remote from the armature 36, and a worm gear 47 meshed with the worm 46 for transmitting the rotational force of the motor 11 to an external drive element. The first to third recesses 41 to 44 are so defined as to occupy the respective positions in alignment with the commutator 35, the armature 36 and the bearings 38 and 39.

The wall defining the shaped cavity 34 is formed with at least two spaced pairs of engagement pawls 49 (only one pair being shown in FIG. 3) confronting the respective second recesses 42 for retaining the associated field magnet pieces 51 in position within the second recesses 42 in cooperation with other projections (not shown) protruding towards the second recesses 42 from the innerr door panel, and also with a projection 53 confronting the third recess 44 for the bearing 39 and adapted to fixedly support a plate member 52 for receiving thrust of the worm 46.

Reference numeral 54 represents a bearing for rotatably supporting the worm gear 47 which is formed in the wall defining the cavity 34 so as to confront the fourth recess 48. Reference numeral 56 represents a plurality of holes for receiving set bolts or rivets to be used for securing a cover member, as will be described later, to the flat rim area 55 so as to close the opening of the shaped cavity 34. Reference numeral 57 is a provision for accommodating a liquid sealing material of a type which will transform into an elastic or hard seal interposed between the rim area 55 and the cover member.

In an assembled condition, as best shown in FIGS. 4 and 5, the brush holder 59, the field magnet pieces 51 made of ferrite, and the bearings 38 and 39 are accommodated in the first recess 41, the second spaced recesses 42 and the third spaced recesses 43 and 44, respectively, while the assembly of the motor shaft 37 carrying the commutator 35 and the armature 36 is accommodated in the shaped cavity 34 with the armature 36 positioned between and surrounded by the field magnet pieces 51. The shaped cavity 34 is so sized, and has such a depth, that, when the assembly of the motor shaft 37 with the commutator 35 and the armature 36 is accommodated therein in the manner as hereinabove described, the motor shaft 37 can lie in parallel to and inwardly of the plane of the opening of the shaped cavity 34.

After the assembly of the motor shaft 37 with the commutator 35 and the armature 36 thereon has been set in position within the shaped cavity 34 together with the brush holder 59, the field magnet pieces 51 and the bearings 38 and 39, the worm gear 47 is placed within the fourth recess 48 with its peripheral teeth held in mesh with the worm 46 on the motor shaft 37, and then the cover member 58 is set in position to close the opening of the shaped cavity 34 with its peripheral portions secured to the flat rim area 55 by set screws or rivets engaged therethrough into the holes 56.

The cover member 58 in this invention serves as the other of the casing halves of the casing for the motor and may be of a substantial plate like configuration in the depth of the shaped cavity 34 is enough to accommodate the component parts of the motor substantially completely within the cavity 34. As best shown in FIG. 5, the cover member 58 so far shown has first, second, third and fourth recesses 61, 62, 63, and 64, and 66 all defined therein. The first recess 61 is of a shape which may be identical in part or in whole with or correspond to the shape of the first recess 41 in the wall defining the cavity 34 and accommodates the portion of the brush holder 59 which recesses 62, spaced from each other, are of a shape which may be identical in part or in whole with or correspond to the shape of the respective second recess 42 in the wall defining the shaped cavity 34 and accommodate the respective portion of the field magnet pieces 51 which protrudes outside the shaped cavity 34. The third recesses 3 and 64, spaced from each other, are of a shape which may be identical in part or in whole with the shape of the respective third recess 43 or 44 in the cavity defining wall and to accommodate the respective portions of the bearings 38 and 39 which protrude outside the shaped cavity 34. The fourth recess 66 is of a shape which may be identical in part or in whole with the shape of the fourth recess 48 in the cavity defining wall and accommodate the portion of the worm gear 47 which protrudes outside the fourth recess 48 in the cavity defining wall. It is to be noted that the cover member 58 has a bearing 67 defined therein in alignment with the bearing 54 for the support of a drive shaft on which the worm gear 47 is mounted for rotation. In the assembled condition as shown in FIG. 5, the drive shaft with the worm gear 47 mounted thereon has one end situated outside the cover member 58 and on which a drive pinion 68 is rigidly mounted.

So far as the embodiment shown in FIGS. 2 to 6 is concerned, the drive pinion 68 is meshed with the large diameter gear 15 of the reduction gear train 14 shown in FIG. 1.

From the foregoing, it is clear that the assembly of the D.C. motor 11 and the installation thereof can be carried out at the same site. Specifically, both can be carried out by setting the field magnet pieces 51, the armature 36 and the worm gear 47 in the shaped cavity 34 in the inner door panel 31 and then setting the cover member 58 to close the opening of the shaped cavity 34. Since the position where the motor 11 is to be located is determined by the position of the shaped cavity 34, there is substantially no possibility of any error occurring during the installation of the motor 11.

Reference numeral 69 represents respective iron plates secured to the inner door panel 31 and the cover member 58 and positioned exteriorly of the confined shaped cavity 34 for forming a magnetic field circuit for the field magnet pieces 51.

Figure 7:
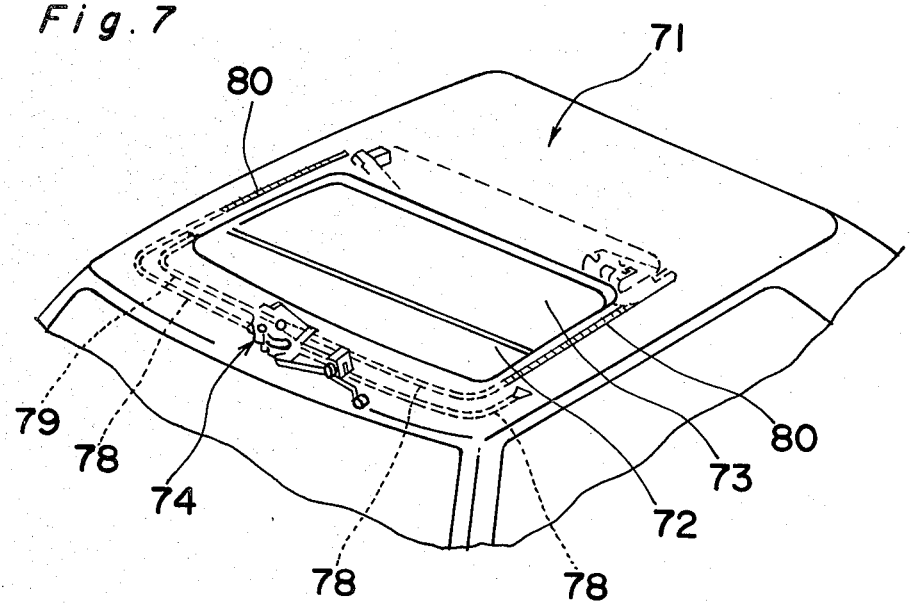
FIG. 7 is a perspective view showing a powered sunroof regulator to which this invention is applied as a second preferred embodiment thereof.
Figure 8:
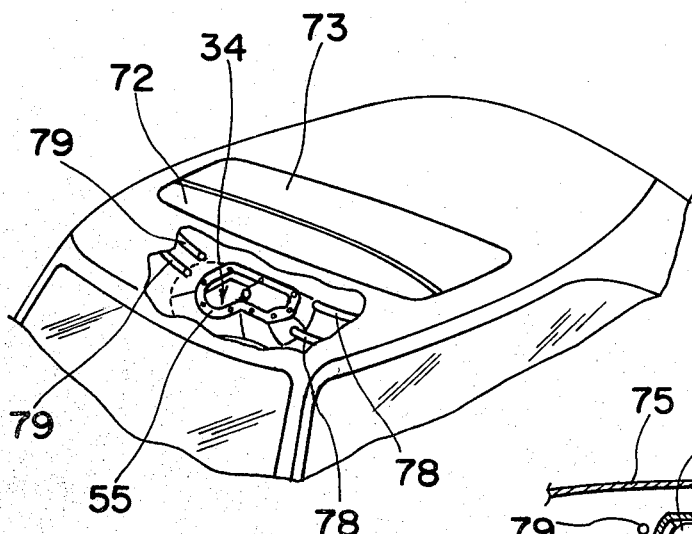
FIG. 8 is a perspective view, with a portion broken away, showing the shaped cavity defined in a portion of the roof of the automobile body structure.
Figure 9:
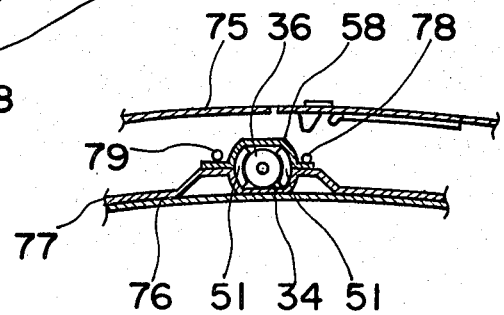
FIG. 9 is a side sectional view of that portion of the roof, showing the motor set in the shaped cavity and covered with the covering member.

As shown in FIG. 7, this invention can be applicable to any known powered sunroof regulator for driving a sunroof 73 for selectively opening and closing an opening 72 defined in the roof 71 of the automobile body structure. The D.C. motor for the sunroof regulator is generally identified by 74. In this embodiment, as best shown in FIGS. 8 and 9, the shaped cavity 34, including the first to fourth recesses 41, 42, 43 and 44, and 48, is formed in a ceiling panel 77, forming a part of the roofing together with a roofing panel 75, by the use of any known press work in a manner similar to the embodiment shown in FIGS. 2 to 6. In this embodiment, the drive pinion 68 (FIG. 5) is used to drive a winding wheel (not shown) which serves to draw cables 80, extending in respective sheaths 78, in the opposite directions, one at a time, to open or close the sunroof 73.

Even in this embodiment, the casing for the motor 74 is constituted by the wall defining the shaped cavity 34, that is, that portion of the ceiling panel 77, and the cover member 58.

In FIG. 9, reference numeral 76 represents an interior lining provided on the ceiling panel 77 and facing the passenger's compartment in the automobile body structure.

Figure 10:
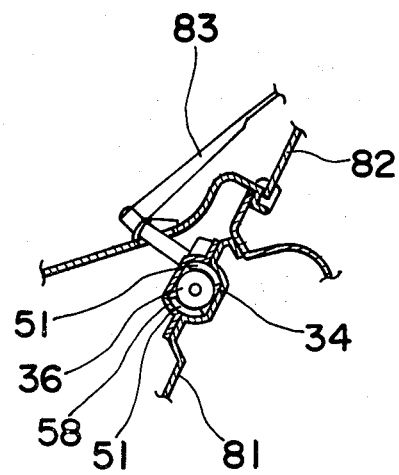
FIG. 10 is a side sectional view, showing a front windshield wiper to which this invention is applied as a third preferred embodiment.
Figure 11:
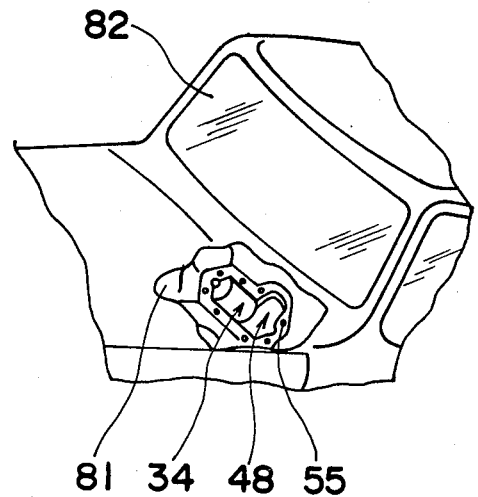
FIG. 11 is a perspective view, with a portion broken away, to show the motor for the wiper accommodated in the shaped cavity.
Figure 12:
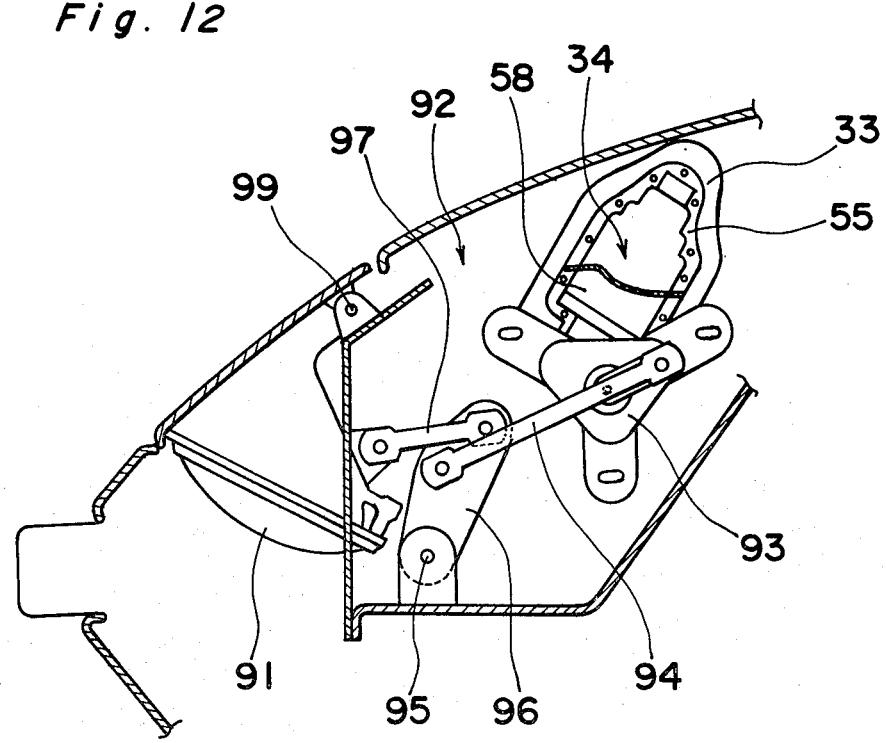
FIG. 12 is a side sectional view of a front portion of the automobile body structure, showing a retractable headlight actuator to which this invention is applied as a fourth preferred embodiment.

Referring now to FIGS. 10 and 11 in which the application of this invention to a front windshield wiper is shown, the shaped cavity 34 including the first to fourth recesses 41, 42, 43 and 44, and 48 is formed in a portion of a dashboard panel 81. In this embodiment shown in FIGS. 10 and 11, the drive pinion 68 (FIG. 5) is drivingly coupled to a wiper arm 83, which sweeps the front windshield 82, in any manner known to those skilled in the art.

Where this invention is desired to be applied to a retractable headlight actuator, the shaped cavity 34 including the first to fourth recesses 41, 42, 43 and 44, and 48 should be formed in a wall member which defines a headlight compartment 92 for accommodating a headlight 91 when the latter is in a retracted position as shown in FIG. 12. The formation of the shaped cavity 34 in the wall member should be carried out by the use of any known press work before such wall member is installed in the automobile body structure, particularly a front body structure, to define the headlight compartment 92. In the assembled condition, the drive pinion 68 (FIG. 5) is drivingly connected to the headlight 91 through a <motion transmitting mechanism which comprises, so far as shown, a rotary plate 93 coupled to the drive pinion 68, a cranking rod 94 connected pivotally at one end to the rotary plate 93 in offset relation and at the other end to a rocker lever 96 pivotally mounted on a pivot shaft 95 within the headlight compartment 92, and a driving rod 97 pivotally connected at one end to the rocker lever 96 and at the other end to the headlight 91 to cause the latter to pivot about a pivot pin 99 between retracted and erected positions.

From the foregoing, it has now become clear that, according to this invention, the casing for the D.C. motor is constituted by the wall defining the shaped cavity 34 and the cover member 58, which wall is an integral part of the automobile body structure. Accordingly, the assembly of the motor and the installation thereof to the automobile body structure can advantageously be performed at the same site, thereby minimizing the number of the manufacturing steps and with no substantial possibility of any error which would occur where the completely assembled motor is installed on the automobile body structure. Moreover, the provision of the shaped cavity formed by any known press work improves the rigidity of that portion of the automobile body structure where it has been formed, thereby enabling the use of light-weight material, and the reduction in weight of the automobile body structure.

Although the present invention has fully been described in connection with the preferred embodiments thereof with reference to the accompanying drawings, it is to be noted that various changes and modifications are apparent to those skilled in the art. By way of example, although the shaped cavity 34 defined in that portion of the automobile body structure has been described as having a depth greater than that of the corresponding cavity in the cover member 58, they may be reversed with each other and, in this case, the cover member 58 after having accommodated the field magnet pieces 51, the armature 36, the worm gear 47, the bearings 38 and 39 and the commutator 35 may be secured to the flat rim area 55 on the part of the automobile body structure.

Moreover, the concept of this invention can also be applicable to a radio antenna lifter operable to selectively extend and retract a telescopically movable antenna assembly merely by manipulating a switch disposed on the automobile dashboard.

Accordingly, such changes and modifications are to be understood as included within the scope of this invention unless they depart therefrom.

I claim:

1. In combination with a vehicle having structural body parts, an improved electrical motor housing assembly supporting an armature and an output shaft comprising:

a panel member having a primary configuration to form a structural portion of the vehicle body and an integral secondary configuration to form a recess that provides a first motor housing part with a first flat rim encircling the recess, the flat rim positioned inward and separate from the periphery of the primary configuration;

a second motor housing part having a complementary configuration to the first motor housing part having a second flat rim complementarily to the first flat rim at the outer edge of the second housing part, and means for connecting the first and second housing part together for abutment of their flat rims and to locate and position the armature and output shaft whereby the assembling of the panel member to perform its primary configuration function relative to the vehicle body also precisely locates the relative position of the motor and forms an operative portion of the motor housing.

2. The invention of claim 1 wherein the motor includes field magnetic pieces, and the panel member recess has a cavity shape to support the field magnetic pieces.

3. The invention of claim 1 further including a motor transmitting mechanism for transmitting the rotational force of the output shaft to an externally driven member, the panel member recess has a cavity shape to support the motion transmitting mechanism.

4. In combination with a vehicle having structural body parts, an improved electrical motor housing assembly supporting an armature, an output shaft, bearings, field magnet pieces, and contact brushes, comprising:

a panel member having a primary configuration to form a structural portion of the vehicle body and a secondary configuration to form a recess that provides a first motor housing part, the recess being divided into a plurality of separate cavities, each of a configuration to support a portion of the electrical motor parts, such as bearings field magnet pieces and contact brushes;

a second motor housing part having a complimentary configuration to the first motor housing part, and means for connecting the first and second housing part together to locate and position the armature and output shaft whereby the assembling of the panel member to perform its primary configuration function relative to the vehicle body also precisely locates the relative position of the motor and forms an operative portion of the motor housing.

5. The invention of claim 4 further including a sealing groove positioned on one of the first and second flat rims.

6. The invention of claim 5 wherein the plane of the panel member is approximately in the same plane as the bottom of the recess, and the plane of the first flat rim is approximately parallel and offset from the panel member.

7. A motor mounting in an automobile body structure for a D.C. motor including a motor shaft with an armature and a commutator mounted adjacent each other ont the motor shaft for rotation therewith, a pair of spaced contact brushes slidingly engaged with the commutator for supplying electrical power to the armature through the commutator, at least one pair of field magnet pieces opposite in polarity to each other and encircling the armature, comprising:

a casing for accomodating all of said motor shaft with the commutator and armature thereon, a holder for holding the contact brushes and said field magnet pieces therein, said casing comprising casing halves, one of said casing halves being an integral part of the automobile body structure and having a shaped cavity subdivided into first, second, third and fourth recesses for accomodating respective portions of the brush holder, field magnet pieces, bearings for the motor shaft and a motion transmitting mechanism for transmitting the rotational force of the motor shaft to an external driven element, the other of the casing halves being constituted by a cover member and having a shaped cavity defined therein for attaching respectively the other portions of the brush holder, field magnet pieces, bearings and the motion transmitting mechanism, said respective cavities being nonsymmetrical.

8. In combination with a vehicle having structural body parts, an improved electrical motor housing assembly supporting an armature, an output shaft, bearings, field magnet pieces, and contact brushes, comprising:

a press stamped panel member having a primary configuration to form a structural portion of the vehicle body and a secondary configuration integral with the primary configuration to form a recess having a support wall that provides a first motor housing part, the recess being divided into a plurality of separate cavities, each cavity of a configuration to support a portion of the electrical motor parts, such as bearings, field magnet pieces and contact brushes, at least some of the cavities further providing integral supporting pawls extending from the cavity support wall for positioning some of the motor parts in an operative position, the panel member further providing an integral encircling flat rim section that extends around the peripheral of the secondary configuration with an integral sealing groove positioned on the flat rim section;

a second motor housing part having a complementary configuration to the first motor housing part including a second recess having a plurality of separate cavities, each of a configuration to support a portion of the electrical motor parts, and a second flat rim section encircling the second recess and complementarily to the first motor housing encircling flat rim;

sealing means for the sealing groove, and means for connecting the first and second housing parts together to locate and position the armature and output shaft and close the sealing groove to seal the motor within, whereby the assembling of the panel member to perform its primary configuration function relative to the vehicle body also precisely locates the relative position of the motor and forms an operative portion of the motor housing.

* * * * *